United States Patent [19]

Virgili

[11] Patent Number: 4,496,511

[45] Date of Patent: Jan. 29, 1985

[54] METHOD OF MOLDING STONE FACED PILLARS AND THE LIKE

[76] Inventor: John H. Virgili, 507 Oakwood Ave., Springdale, Pa. 15144

[21] Appl. No.: 422,039

[22] Filed: Sep. 23, 1982

[51] Int. Cl.[3] .................................................. B29C 1/02

[52] U.S. Cl. ...................................... 264/225; 249/48; 249/143; 264/219; 264/220; 264/247; 264/316

[58] Field of Search ............... 264/220, 225, 226, 219, 264/221, 247, 316, 143; 249/48

[56] References Cited

U.S. PATENT DOCUMENTS

| | | | |
|---|---|---|---|
| 840,637 | 1/1907 | Locher | 249/48 |
| 985,661 | 2/1911 | Connors | 249/48 |
| 2,172,466 | 9/1939 | Edwardes et al. | 264/316 X |
| 3,177,279 | 4/1965 | Bilodeau | 264/309 |
| 3,269,886 | 8/1966 | Dellenbaugh | 264/220 X |
| 3,291,436 | 12/1966 | Berghammer | 249/48 X |
| 3,312,761 | 4/1967 | Vida | 264/219 X |
| 3,388,203 | 6/1968 | Meininger et al. | 264/226 X |
| 3,867,501 | 2/1975 | Powers et al. | 264/219 |
| 3,950,477 | 4/1976 | DiGiacomo | 264/316 X |
| 3,952,992 | 4/1976 | Vyprachticky | 264/247 X |
| 3,989,790 | 11/1976 | Bruner et al. | 264/220 X |
| 4,269,385 | 5/1981 | Bowman | 249/165 |

*Primary Examiner*—Jay H. Woo

*Assistant Examiner*—James C. Housel

*Attorney, Agent, or Firm*—William J. Ruano

[57] ABSTRACT

A method of molding stone-faced pillars comprising attaching stone pieces onto a wooden base, covering the surface of said base, not covered by the stone pieces, with Plaster-of-Paris, spraying numerous coatings of latex rubber on the entire base and stone pieces of the pillar and spraying numerous coatings of liquid base fiberglass on said coatings, peeling off said coatings, and laying them in right angular relationship in a right angular mold and finally pouring wet cement onto the stone-faced portions to reproduce the stone faced pillar model.

5 Claims, 5 Drawing Figures

METHOD OF MOLDING STONE FACED PILLARS AND THE LIKE

This invention relates to a method for molding stone-faced pillars and the like.

In the past, no successful method has been used for molding large objects, such as stone-face pillars. The methods involved use of large amounts of cement and laborious effort to mold individual pieces of the stone-like finish.

An object of my invention is to overcome the above-named disadvantages by providing a novel method of molding stone-faced pillars and the like by uniquely forming a mold which can be used over and over again for duplicating a model of a stone-faced pillar.

Another object of my invention is to mold stone-faced pillars by means of a mold which will show very fine details of the shape of stone-like covering of the pillars.

Another object of my invention is to provide a reinforced rubber mold which can be used over and over for making identical stone-like pillars with the expenditure of a minimum amount of cement and which will result in a finished pillar having very light weight compared to a conventional stone faced pillar.

Other objects and advantages of the invention will become more apparent from a study of the following description taken with the accompanying drawing wherein.

Figure 1:
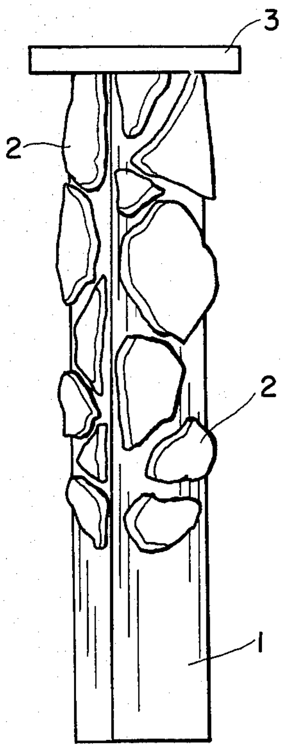
FIG. 1 is a stone-faced pillar serving as a model for making a mold according to the present invention.
Figure 3:
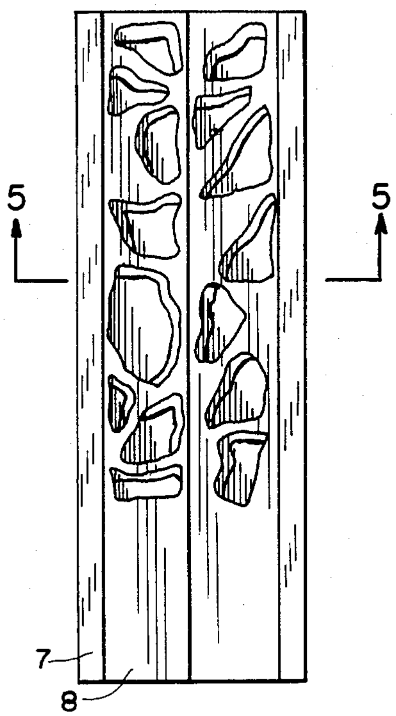
FIG. 3 is a top view of a two-sided mold having a fiberglass-reinforced, rubber lining to serve as a mold.

Referring more particularly to FIG. 1, numeral 1 denotes a four sided model formed of a rectangular wooden base 1 having attached, such as by glue, a plurality of stone pieces 2, and having a top cover 3 which may also be made of wood. The surfaces of the wood 1 which are not covered by stone pieces 2 are coated with Plaster-of-Paris to cover the wood. Then numerous coatings of latex rubber are sprayed onto the stones 2 and wood base 1, each coating being allowed to dry before another coating is sprayed on. Perhaps 40 to 50 separate coatings of latex rubber are sprayed to form about a ½ inch thickness of the latex rubber. Thereafter, the fiberglass particles in a liquid base are sprayed onto the surface of the rubber coating to form numerous coatings, allowing each coating to dry before another is applied and building the rubber base to about an additional ½ inch to make a total of about 1" thick rubber mold reinforced with fiberglass. Of course, the thickness may be made less than 1 inch or more, depending upon the strength desired of the reinforced rubber mold. During spraying, the corners of the mold are provided with separating strips to form supports against which are built up flanges to form separating edges. At about 1 foot spaced intervals, these flanges may be held together by ¼ inch bolts with wing nuts at all four seams, of the type shown in FIG. 2.

Figure 2:
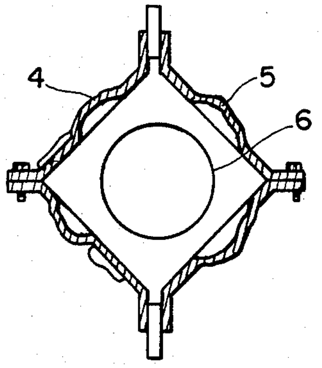
FIG. 2 shows a mold formed of two parts for molding a four sided post.

Referring to FIG. 2, separate molds 4 and 5, each having two sides are bolted together at their flanges for separating edges. A pipe 6 is extended through the molds and wet cement is poured into the space outside of pipe 6 so as to fill the void depicting the stone-like surfaces, such as in FIG. 1. This will reeult in a four-sided pillar of either square or rectangular section, as desired.

Figure 5:
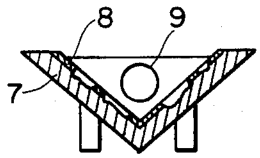
FIG. 5 is a transverse, cross-sectional view taken along line 5—5 of FIG. 3.

FIG. 5 shows a mold having two sides only, comprising a base of wood 7 covered with a fiberglass reinforced rubber lining 8 having stone-like depressions. A pipe 9 may be used to save cement by pouring wet cement around the outside of the pipe and making the surface of the cement in the same plane as the ends of the mold. Of course, two molded pieces may be joined together to form a four sided piece.

Figure 4:
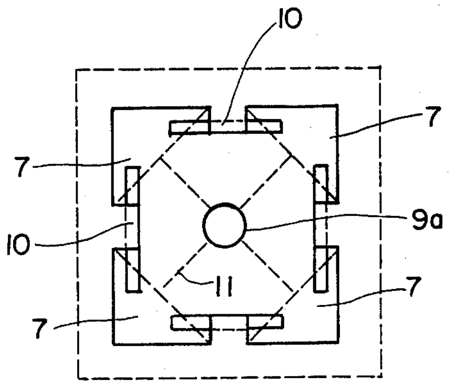
FIG. 4 is an end view showing an arrangement for using four two-sided molds, as shown in FIGS. 3 and 5.

FIG. 4 shows a modification showing four two-sided units 7, such as illustrated in FIG. 5 each having an inner lining, such as 8. A central pipe, such as 9*a* is fastened with wires 11 to the respective molds 7. Marble pieces 10, together with wire connections 11 secured to pipe 9*a* may be used for joining together the four molds 7 to give an artistic appearance to the resulting four sided pillar cast by the assembly of FIG. 4.

After the poured cement exteriorly of pipe 9*a* is cured, the form is removed involving the molds 7 and the perimeter shown outside thereof shown in dotted lines, The interior pipe 9*a* and its wire connections 11 are allowed to remain as a reinforcement to the cast structure.

In some instances, instead of using the rubber latex layers reinforced with fiberglass, the molds, such as shown in FIG. 5, may be of aluminum. However one disadvantage is that an aluminum mold will not show the fine details that a rubber mold would show—furthermore, it is more expensive.

While certain forms may be built up as shown in FIG. 4, other forms may be also built up by using the components of FIG. 5 or FIG. 2 in combination with other parts, such as interconnecting trellises, gates, and the like (not shown).

Thus it will be seen that I have provided an efficient method for molding stone-faced pillars and the like to enable inexpensive molding of duplicate stone-faced pillars with the use and minimum amount of cement and yet having considerable strength and to form a cementitous pillar or post that can withstand all types of weather, winter and summer, as compared to existing metal posts which rust and do not stand up under bad weather.

While I have illustrated and described several specific embodiments of my invention, it will be understood that they are by way of illustration only and that various changes and modifications may be contemplated in my invention within the scope of the following claims:

I claim:

1. A method of forming a right angular mold for forming a pair of surfaces of a stone-faced rectangular pillar, comprising forming a rectangular base, attaching stone pieces to two sides of said base, providing separating strips at the corners of said base, applying molding material to said base and stone pieces, also to said strips so as to form two molding strips, each having molding flanges at the edges thereof, removing said strips, attaching two of said flanges together to form a right angular mold.

2. The method recited in claim 1 further comprising providing a base for said right angular mold.

3. The method recited in claim 1 wherein said base is of wood and wherein said molding material is made up by covering the part of said base which is not covered by stones with Plaster of Paris and applying separate coatings of latex rubber on said part of said base and said stones, then applying several subsequent coats of fiberglass on said latex rubber and stones to form a fiberglass reinforced mold.

4. The method recited in claim 1 wherein a second right angular mold is made from the remaining two surfaces of said stone-faced rectangular pillar by the method recited in claim 1, and finally, the resulting two right angular molds are connected together so as to form a rectangular mold, thereafter a tubular member is inserted in said rectangular mold, and wet concrete is poured between said tubular member and rectangular mold to mimimize the amount of wet concrete needed.

5. The method recited in claim 1 wherein three additional right angular molds formed by the method recited in claim 1 are arranged in spaced relationship to form four corners of a composite rectangular pillar mold by inserting marble strips therein so as to extend between said right angular molds, and inserting tubular means in said pillar mold and pouring wet cement between said tubular means and pillar mold.

* * * * *